(12) United States Patent
Mangold et al.

(10) Patent No.: US 6,321,718 B1
(45) Date of Patent: Nov. 27, 2001

(54) INTAKE MODULE

(75) Inventors: Christof Mangold, Muenchingen; Hermann Maurer, Oberstenfeld; Herbert Pietrowski, Pleidelsheim; Heinz Dobusch, Marbach; Norbert Kleinehakenkamp, Weissach; Thomas Jessberger, Rutesheim, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/381,371
(22) PCT Filed: Feb. 19, 1998
(86) PCT No.: PCT/EP98/00958
  § 371 Date: Dec. 1, 1999
  § 102(e) Date: Dec. 1, 1999
(87) PCT Pub. No.: WO98/42969
  PCT Pub. Date: Oct. 1, 1998

(30) Foreign Application Priority Data

Mar. 20, 1997 (DE) .............................. 197 11 538

(51) Int. Cl.$^7$ ...................................... F02D 1/00
(52) U.S. Cl. ............................ 123/336; 123/337
(58) Field of Search .................... 123/336, 337, 123/432, 442, 583, 584

(56) References Cited

U.S. PATENT DOCUMENTS

| 4,016,838 | 4/1977 | Yoshioka et al. ............... 123/59 |
| 4,823,748 | * 4/1989 | Ampferer et al. ............ 123/336 |
| 5,216,992 | 6/1993 | Ropertz et al. ............... 123/400 |
| 5,687,691 | 11/1997 | Kaiser et al. ............... 123/337 |
| 5,996,549 | * 12/1999 | Mayer et al. ................ 123/336 |

FOREIGN PATENT DOCUMENTS

| 26 06 734 A | 9/1976 | (DE) . |
| 4334180 | * 4/1985 | (DE) . |
| 41 33 858 A | 4/1993 | (DE) . |
| 195 03 771 A1 | 8/1996 | (DE) . |
| 195 10 622 A | 9/1996 | (DE) . |
| 0 174 389 A | 3/1986 | (EP) . |
| 726 388 | * 8/1996 | (EP) . |
| 62-233417 A | 10/1987 | (JP) . |
| 06-173695 A | 6/1994 | (JP) . |

* cited by examiner

*Primary Examiner*—John Kwon
(74) *Attorney, Agent, or Firm*—Crowell & Moring LLP

(57) ABSTRACT

An intake module for an internal combustion engine. The intake module including at least two intake ducts which can be opened and closed by rotatable valves. The valves are connected to one another via a coupling mechanism and to a common actuating mechanism in the form of a servomotor. In order to compensate for tolerances between the valves and the actuating mechanism, the coupling mechanism includes at least one elastic portion, formed by a weakened material portion, which allows the intake valves to be closed and opened completely. The resilience of the coupling mechanism can be brought about by a change in cross-section or a material reduction. In one embodiment of the invention, the coupling mechanism includes multi-part articulated main rods which control the valves by resiliently mounted legs. In another embodiment, the coupling mechanism includes a main rod having branch rods emerging therefrom with a resilient region extending as a relatively thin cross-section of the branch rods over their entire length.

16 Claims, 3 Drawing Sheets

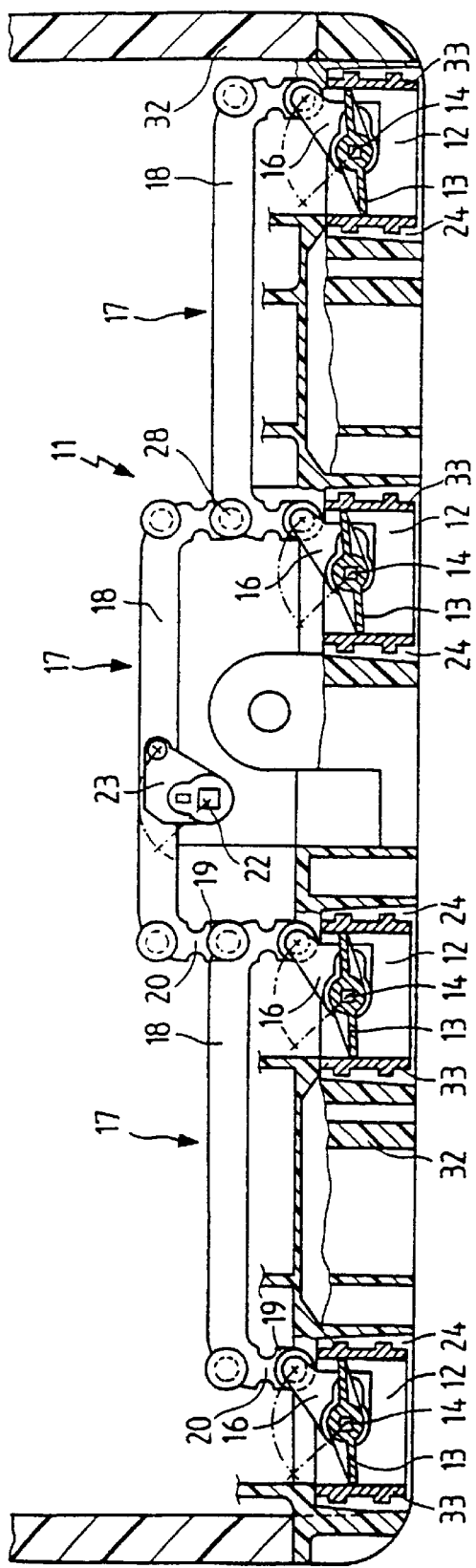
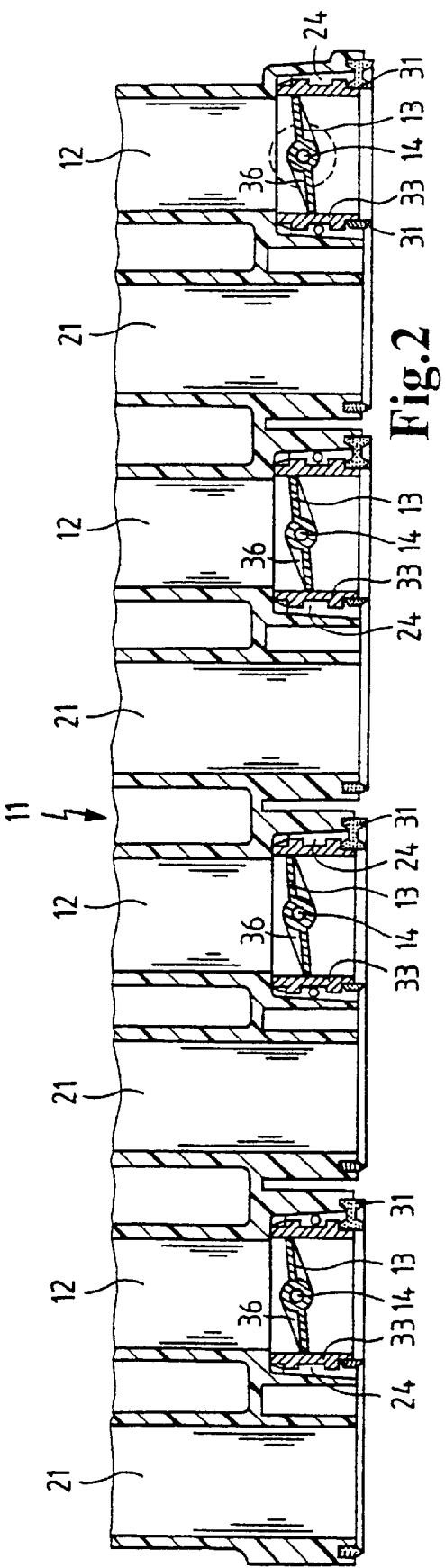
Fig.1
Fig.2

INTAKE MODULE

FIELD OF APPLICATION AND STATE OF THE ART

The invention relates to an intake module, especially for internal combustion engines, having an intake tract with at least two intake ducts and a closing means in each intake duct for affecting the duct cross section.

An intake module of this kind is disclosed in DE 195 03 771 A1 and has the advantage declared therein that, by means of a permanently open and a variably closing intake tube opening, the delivery of the combustion mixture to the internal combustion engine can be optimized for the amount of power required. At an appropriate speed of the motor a rotary valve is opened and the so-called power duct is opened, whereby among other things both the fuel consumption and the discharge of pollutants from the motor can be advantageously reduced.

In the known intake module, however, there is the disadvantage that the operation of the rotary valve controlling the intake duct openings is not without problems. In the case of the embodiment shown in FIG. 4 of DE 195 03 771 A1, four rotary valve are connected together excentrically by a single push rod and can thus be operated. However, due to manufacturing and component tolerances it is very difficult in the system described, and possible only at great cost, to keep all rotary valves each in precisely the same position.

Especially to be noted here are the CLOSED and the OPEN position, for here it is of especial importance that the intake tube opening is either fully closed or fully open. For example, it may be possible, due even to slight variations in the length of the push rod, that in the CLOSED position actually desired, one rotary valve may not completely close the intake tube opening. As a result a different combustion mixture is fed to one cylinder, resulting in poorer combustion and possibly undesired side-effects as well as power losses in the motor. For cost reasons, however, an intake module according to the invention is to be inexpensive and accordingly it has to be made without great complication.

The invention is addressed to the problem of creating an intake module with closing means in intake ducts of an intake tract, which will avoid the disadvantages of the state of the art, call for little complexity in manufacture, and provide reliable operation.

This problem is solved in that at least two closing means can be operated by common actuating means through coupling means which have at least one elastic portion for equalizing tolerances between actuating means and closing means. Elasticity and elastic portion are here to be understood to mean that they are deliberately provided and precisely dimensioned within a range that is advantageous to the application of the invention. Advantageously, they go beyond the elasticity inherent in any workpiece in the case of sufficiently (very) great stress. Accordingly, the force to be applied by the actuating means and producing the elasticity is within a range common for the purpose. On the other hand, the elasticity of the elastic area should not be too "soft," so that at all times a position of the closing means that is established and controllable by the actuating means is assured.

In an embodiment of the invention an elastic link can be provided between actuating means, coupling means and/or closing means. This is possible, for example, through a combination of different materials having different properties as regards strength and stiffness. With special preference, however, an elastic portion is in a zone of weakened material, preferably a thinning, perforation or excavation of material. Thus the strength is reduced at this point and to a certain extent a joint or flexible portion or elasticity portion is created. Also possible is a material modification, as for example local heating or irradiation with UV light which can produce a change or a softening of the area in question.

It is possible to make the coupling means of a plurality of pieces, but preferably they are in one piece, so that the manufacturing and assembly work can be reduced. In case of a multipartite design of the coupling means, identical components can be used or combined advantageously.

In a preferred embodiment, the coupling means have at least one main rod, which especially has at least one elastic portion. Advantageously, therefore, a main rod can connect directly or indirectly together at least two closing means, and especially in the case of the transfer of force it can be made slender along its longitudinal axis and yet sufficiently stable. To reduce the manufacturing cost the coupling means can be journaled substantially to the closing means, since their mounting in the intake ducts is necessary anyway for reliable operation. By this kind of journaling of the coupling means any possible equalization of tolerances by elasticity between actuating means and closing means is improved.

The coupling means can have connecting elements by means of which they can be connected, especially by articulation, to the closing means, the connecting elements preferably extending approximately vertically from the coupling means. Thus the coupling means do not have to run directly to the closing means. The connecting elements can be in the form of branch rods. The vertically reaching connection results in an especially simple possibility for arranging an elastic portion which comprises the connecting elements, which will reach preferably from its beginning to its end. The elasticity in this case consists not in a compression of elongated coupling means in the longitudinal direction, but is created by a flexure only of the connecting elements. In this manner an inherent elasticity can be created, especially in the case of connecting elements connected stiffly to preferably integrally made coupling means. The latter can be more easily flexed in the transverse direction.

In an alternative embodiment it is possible for the connecting elements to be connected elastically or articulately to a main rod and/or to additional components of the coupling means, in which case they are made preferably of rigid shape and the elastic area is provided in the connection. Such a connection can be made, for example, in a connecting portion having a thin cross section or a cross section forming elasticity.

The closing means used are preferably valves, especially substantially round valves which can be rotated about an axis. Such valves are easy to manufacture and install and, due to their relatively small cross section, they block only a small part of the flow cross section of an intake duct. Preferably they can be operated through connecting levers and ball joints of the coupling means or connecting elements.

Designing the coupling means together with the connecting elements makes possible a construction in which a part of the coupling means is moved and thrust substantially in the longitudinal direction, while with connecting elements running out from it closing means at different distances from the coupling means can be pivoted.

Preferably, all closing means assume substantially the same position, two positions being especially provided, a CLOSED and an OPEN position, preferably achievable by means of the tolerance equalization, each of these positions being determined by abutments for the closing means. Thus individual closing means can be urged toward an end position and additionally urged by the coupling means in order to urge any closing means which are not yet entirely in the same position, likewise against their abutments. Then the force applied by the actuating means to the closing means or valves can be reduced or removed.

Rotatory actuating means and a substantially translational movement of the coupling means are possible, in which case a conversion of the rotary movement to longitudinal movement is accomplished through an excentric pin on the actuating means and a removal opening in the coupling means, especially substantially in the direction of the longitudinal axis of the coupling means, the actuating means being able to be formed by a servomotor plus gearing.

In the case of a multipartite design of the coupling means, it consists preferably of a plurality of main rods with arms extending therefrom as connecting elements for closing means in the form of valves. The main rods can be articulated together, the elastic portion being made, for example, as a thinning of the material in the connection to the arms, and preferably the operation of two main rods, to each of which two valves are connected by a third main rod connected to the two main rods. Advantageously the main rods are made substantially identical to reduce the manufacturing and assembly costs.

Alternatively, it is possible to make the coupling means integral with a main rod and branch rods extending vertically therefrom to connect with the closing means in an intake duct. In that case the elastic portion, as a cross-sectional variation or narrowing of the branch rods in comparison with the main rod, can extend through the entire length of the branch rods, the elasticity being achieved by their vertical arrangement. The cross-sectional narrowing can likewise be formed as a joint only in a limited portion, preferably the connecting portion. The movement takes place substantially in the direction of the main rod.

The coupling means and/or the connecting elements are preferably made by the injection molding method, from plastic for example. Especially preferred is the use of a thermoplastic provided with differently and variously oriented cross-sections and profiles according to its stiffness or elasticity.

To carry gases from the crankcase vent, exhaust feedback or fuel tank venting, an annular gap can be associated with each intake duct. This constitutes a simple kind of gas management.

A seal, preferably of elastic material, is preferably provided on the end of the intake module facing the internal combustion engine to serve as a tolerance equalizing element. By means of this seal, an insert containing the valves is urged against the intake module or against the intake duct, and the intake module is urged against the internal combustion engine, and these connections are hermetically sealed.

The intake module is preferably made of an injection molded plastic or of several injection molded parts. This involves considerable weight advantages over metal intake modules; furthermore it is easier to recycle.

These and additional features of preferred embodiments of the invention will be found not only in the claims but also in the description and the drawings, and the individual features can be realized each by itself or together in the form of subcombinations in the embodiment of the invention and in other fields, and can constitute advantageous as well as independently patentable embodiments, for which protection is hereby claimed. The division of the application into individual sections as well as section titles do not limit the general validity of the statements made therein.

BRIEF DESCRIPTION OF THE DRAWINGS

Two embodiments of the invention are represented in the drawings and are explained more closely hereinafter. In the drawings:

FIG. 1 shows a longitudinal section through an intake module according to the invention with multipartite coupling means, FIG. 2 the arrangement of the valves in the particular duct of an intake module, FIG. 3 a detail of the intake module, FIG. 4 a cross section through the intake module of FIG. 1 to explain the mounting of a closing valve with coupling means and valve driver, and FIG. 5 a perspective view of coupling means made in one piece, with valves fastened thereon.

DESCRIPTION OF TWO PREFERRED EMBODIMENTS

Figure 3:
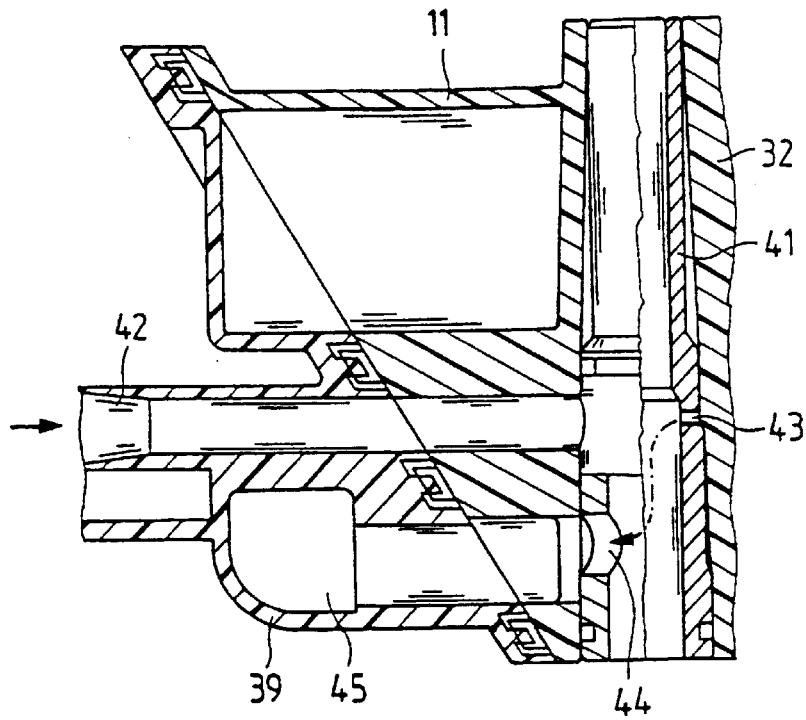

FIG. 1 shows an intake module 11 pursuant to the invention, in a longitudinal section, wherein only the connectable intake ducts 12 are shown. In these intake ducts 12 are the valves 13 represented in a side view, which are mounted for rotation on a shaft 14 passing through their center in the plane of the valve. In the position shown in FIG. 1, which is the same for all valves 13, they close the intake ducts completely.

At one end of the shaft 14 is an approximately triangular pivoting crank 16 through which the valves can be turned about the shaft. Within the scope of the invention it is also possible to provide the elastic part here. Thus either the pivoting cranks 16 can be elastic, or else preferably the shaft 14 can be equipped with a certain elasticity for a limited torsion, for example through the use of a suitable material or through a slimming of the cross section as the elastic part.

Initiation of the movement is made through main rods 17, one of which connects together the two left valves and another the two right valves. Then through a third main rod 17, the two outer main rods are joined together, in which case the motion is initiated by this middle main rod.

All three main rods 17 are substantially identical in form, with a straight main portion 18 from whose two ends two short arms 19 project approximately vertically as connecting elements. The connection point between the arms 19 and the main part 18 is clearly seen to have a reduced cross section serving as the elastic area due to the thinner portion 20 of its material. In this manner an elastic movement of the arms 19 on the main part 18 is possible within certain limits, which in this case amounts to a flexure of the arm at the thinner portion 20 as an articulation. At their outer ends the arms 19 are connected to the pivoting cranks 16, as is shown in detail in FIG. 4. Since in the case of the arrangement represented in FIG. 1, it is substantially only forces in the plane of drawing that occur, and these mainly in the direction of the main portions 18; it is only the elasticity of an elastic portion of the main rods 17, acting in this plane and in this direction and serving as coupling means, that is of importance.

The coupling means is driven by a servomotor with gearing, which is not represented; on the output shaft 22 (made with a square cross section) thereof a link 23 is placed, which is connected to the main portion 18 of the central main rod 17 at a point offset from the output shaft.

Broken lines in FIG. 1 represent the arcs described by the link 23, the same as in the case of each of the valves 13. It can be seen that a counterclockwise turn of about 90° is possible. The movement of the main rods 17 in that case is composed of rotational and translational components, and due to the geometrically identical shapes of the link 23 and of pivoting cranks pivoting cranks 16 these parts all perform identical movements. It can be seen that, in case of a 90° counterclockwise rotation, the valves 13 in FIG. 1 will be upright and thus will be approximately in line with the intake duct 12, and open up a maximum free flow cross section. Between the wall of the intake duct 12 and that of the intake module 11 an annular gap 24 can clearly be seen, through which crankcase gases or fuel vapors can be fed to the motor.

The main portion 18 of the main rod 17 is made to be rigid with respect to the action of a force in the direction of its length. Like the arms 19 with pivoting cranks 16, the main rods 17 are connected to one another by ball joints, see FIG. 4. The central main rod 17 differs from the outer two only in that the link 23 is pivotally attached to it approximately at its center.

In FIG. 2 the intake module 11 is shown in section, the plane of section passing through the center of the valves 13. Here, again, the valves are shown in the CLOSED position.

FIG. 3 shows a detail of the intake module 11 which is welded to a bracket 39. In the intake module 11 there is a sleeve 41, preferably of metal, by which the intake module can be fastened to the cylinder head of an internal combustion engine. Crankcase gases which are to be returned to the combustion chamber enter through the opening 42, are carried through opening 43 into the cavity of the sleeve 41 and flow from there through the opening 44 into a distribution duct 45. From the distribution duct 45 they pass, as shown in FIG. 2, into the annular gaps 24.

Figure 4:
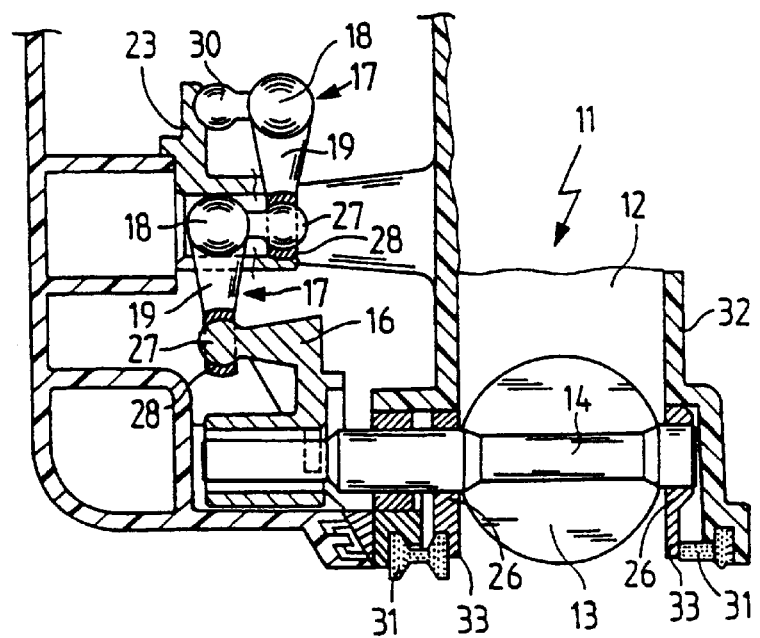

FIG. 4 shows the intake module of FIG. 1 in cross section, the valve 13 being in the OPEN position, in contrast to FIG. 1, and the intake duct 12 has as large an internal cross section as possible. The round shape of the valve acting as the closing means is clearly to be seen. The shaft 14 is journaled at both ends in plastic bushings 26 which can consist preferably of self-lubricating plastic, such as POM (polyoxymethylene), for example. At its end projecting through the plastic bushing 26 and provided with a square cross section there is attached the pivoting crank 16. It has a projecting pin with a spherical extremity 27 which is engaged in a ball joint socket 28 of the arm 19. As it can be seen from the profile top view of the main rod 17, the latter tapers from the main portion 18 to the arm 19. Thus an elastic or yielding configuration of the main rod 17 can also be achieved here.

From the main rod 17, which joins two valves 13 to one another, an additional ball-end pin 27 extends, which in turn is engaged in a ball joint socket 28 of the arm 19 of the central main rod 17. In this manner the valves 13 are each connected through the pivoting cranks 16 to the main rods 17, so that tolerance equalizing movements are possible not just in the plane of FIG. 1. The central main rod 17 is driven by a servomotor, not shown, through a connecting pin 30 on the link 23. The entire operating mechanism is integrated in a housing and thus is not exposed to dirt or to any gases, so that high reliability of operation is achieved.

On the bottom side of the intake module 11 a seal 31 is provided which surrounds the intake duct 12 to serve as a tolerance equalizing element between a valve mounting 33, which contains the plastic valve bearings 26, and the base structure or housing 32 of the intake module 11. In this manner a closing means holder is possible which can be inserted into the housing 32 and can be closed or steplessly opened especially well by a round valve 13. This offers the advantage that, in contrast to the rest of the housing 32 of the intake module 11 and to the intake duct 12, only the valve mounting 33 needs to be made with close component tolerances in order to achieve a reliable closure by the valve 13.

Figure 5:
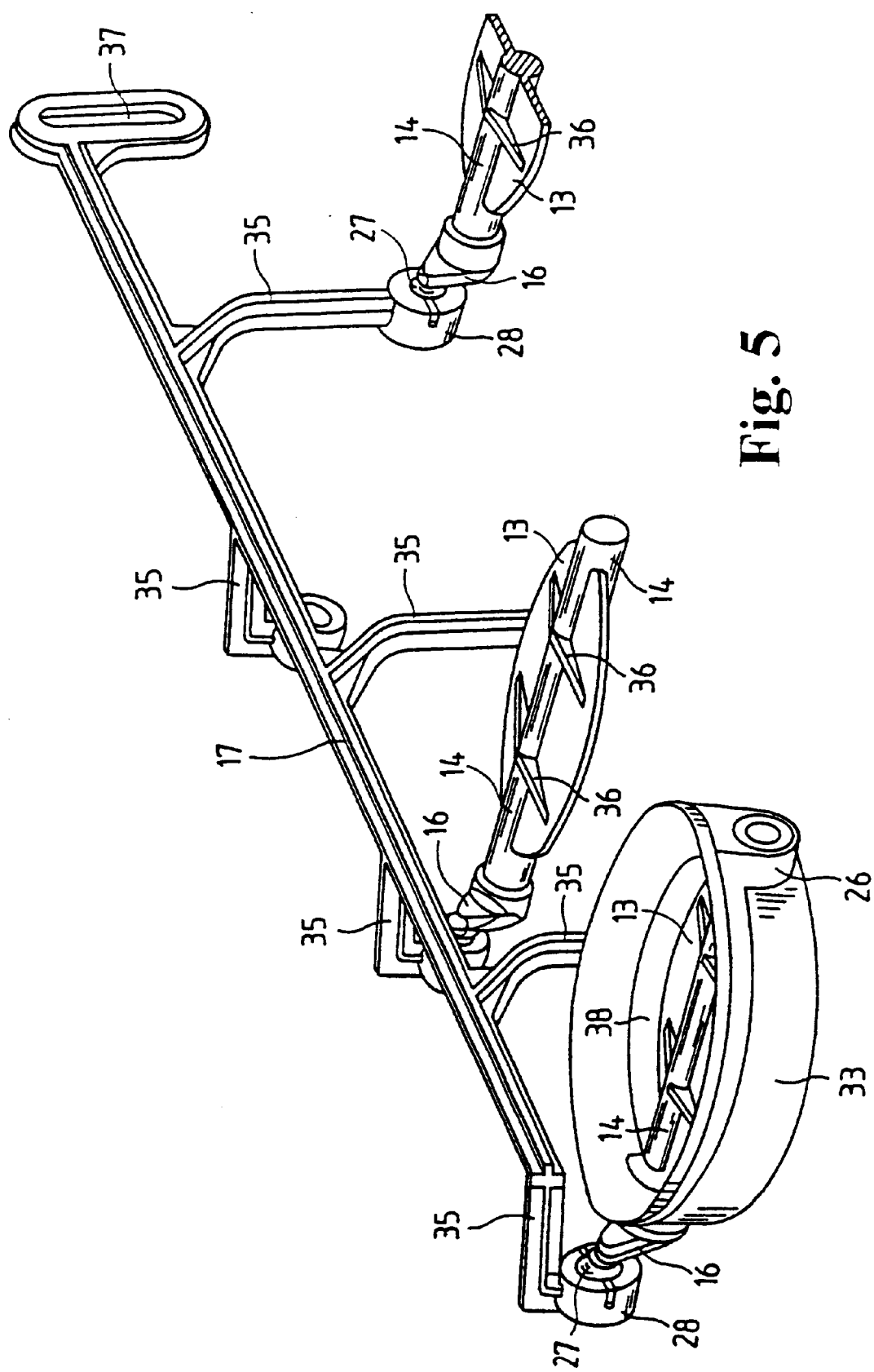

In a variation of the construction of the coupling means represented in FIGS. 1 and 4, there is shown in FIG. 5 a one-piece embodiment in a diagonal perspective view, but one which can easily be replaced by the other version. It consists of an elongated main rod 17 from which three branch rods 35 extend subtantially horizontally, to the rear on the left and to the front on the right. Both the main rod 17 and the branch rods 35 have a constant cross section, which, as it can be seen in the case of the main rod, can be in the form of cross ribbing, for example.

The elasticity in the branch rods is achieved only by the selection of an appropriate cross section which remains equal through the entire length from the connection to the main rod to the ball joint bearing bushes, the rearwardly extending branch rods have a different cross section than the ones extending forward. The cross section and length of the branch rods 35 are made such that all ball joint bearing bushes 28 at the ends of the branch rods have the same elasticity with respect to the main rod 17. In reference to FIG. 5, this signifies that the rearwardly extending branch rods have a lesser elasticity on account of their decidedly shorter length and thus a cross section providing a greater elasticity than the forwardly reaching branch rods. The latter are longer, and for this reason their cross section is stronger and less elastic, due for example to cross ribbing that increases stiffness. An additional control or increase of the elasticity can be achieved by the bend made at a certain angle in the shape of the branch rods 35, which in the case of the short branch rods amounts to about 90° and in the long ones to about 135°.

In a manner similar to the preceding figures, pivoting cranks 16 are fastened by means of ball-end pins 27 in the ball joint bearing bushes 28 which are situated on shafts 14 of valves 13. As it can be seen in FIG. 5, the valve 13 and shaft 14 can be integral or made of a single casting, possibly even with the pivoting crank 16 formed thereon. To increase the stiffness of the valves 13 reinforcing ribs 16 are provided.

FIG. 5 shows the mounting of a valve 13 in a valve mounting 33 which consists of a plastic material described above and can be in the shape of, say, a section of pipe. On its right portion can be seen one of the plastic bearing bushes 26 in which the right end of the shaft 14 is journaled. It has a rather bead-like abutment 38 which projects from its inner wall and forms a semicircle between the bearing bushes 26. The valve 13 strikes it from the bottom, so that in this case an actuation of the coupling means to the right takes place in the clockwise direction. The abutment forming the other semicircle is then situated below the valve so that the valve lies on top of it. The valve in this position against these abutments shuts off the intake duct. The valve mounting 33 is inserted into the housing 32 of the intake module 11 and is preferably sealed against it by a gasket 31.

In order to be driven, the main rod 17 has at its right end an opening 37 into which a link pin 30 or an eccentric pin of a driver enters to operate it. The movement of the main rod 17 and of the pivoting cranks 16 and valves 13 is performed in a manner similar to that described in FIG. 1.

Operation

For assembly, the valve mountings 33 containing the valves 13 are inserted into the intake ducts and into the housing 32 of the intake module 11. The main rods 17 are attached by means of the ball joints to the pivoting cranks 16 formed on or attached to the shafts 14 of the valves 13, this operation being largely the same in both of the embodiments according to FIG. 1 and FIG. 5. Then the coupling means are connected to the operating drive, for example through a link pin 30 which enters into an opening 37 on the coupling means or on a main rod 17. Thus, the coupling means or the main rod 17 with arms 19 and branch rods 35 are linked only to the valves 13 and possibly also to the link pin 30 of the operating drive; no further connections are necessary.

The rotatory operation of the drive is converted to a movement of the main rods 17 that consists substantially of rotary and translational components, the ball joint bearing bushes 28 situated at the ends of the arms 19 and branch rods 35 describe an arc corresponding to the movement of the link pin 30. This is followed by a purely rotatory movement of the pivoting cranks 16 and of the valves 13 connected with them through the shaft 14. This arc extends preferably over 90°, the two maximum end positions being a CLOSED position and an OPEN position, respectively. In the valve mountings 33 abutments may be present which prevent the valves from turning past either of the two end positions.

The invention can be advantageously combined with such abutments since, for example, valves 13 that are in a position slightly ahead of the others reach the end position established by the abutments first, while all valves that can be rotated further by the continued movement of the coupling means can then also run against the abutments to their end positions. Further movement of the coupling means after one valve has already arrived against the abutment is made possible by the elasticity provided by the invention between closing means or valves 13 and the actuating means or drive. The elasticity thus equalizes the tolerances between the positions and abutments of the end positions of the valves. Thus the valves 13 do not have to be at every moment precisely in the same position, since this position is automatically achieved in the two important positions, the CLOSED and the OPEN position by the tolerance equalization resulting from the elasticity.

An alternative way of obtaining the elasticity might also consist in an elasticity produced along the translational movement of the coupling means, for example in the form of a longitudinal springing of the main rod 17. What would be possible in this case is a telescoping resilient arrangement. The great advantage of the embodiments of the coupling means represented in FIGS. 1 and 5 is, however, they are achieved without additional springs or resilient elements, since the elasticity is in each case inherent in the coupling means. Especially advantageous is the embodiment of FIG. 5, since the coupling means can be made in one piece, thereby facilitating installation.

What is claimed is:

1. An intake module comprising:
    at least two intake ducts;
    a rotatable valve operatively arranged in each intake duct to open and close each respective intake duct by rotating about a shaft which defines a rotation axis; and
    a common actuating mechanism operatively arranged to actuate the at least two rotatable valves through a coupling mechanism comprising pivoting cranks;
    wherein the coupling mechanism comprises at least one elastic portion formed by a weakened material portion which provides tolerance equalization between the common actuating mechanism and the at least two rotatable valves.

2. Intake module according to claim 1, wherein the at least two valves, shafts and pivoting cranks are multipartite.

3. Intake module according to claim 1, wherein each valve, shaft and pivoting crank forms a one piece assembly.

4. Intake module according to claim 1, wherein the coupling mechanism comprises at least one main rod which comprises the at least one elastic portion.

5. Intake module according to claim 3, wherein the coupling mechanism comprises a one-piece arrangement comprising connecting elements comprising branch rods each being operatively connected to the at least two valves, the connecting elements extending substantially horizontally.

6. Intake module according to claim 5, wherein the branch rods form the elastic portions of the integrally formed coupling mechanism.

7. Intake module according to claim 6, wherein the connecting elements are connected elastically to a main rod of the coupling mechanism, the connecting elements being relatively stiff and the elastic portions being formed at a connection of the connecting elements to the main rod.

8. Intake module according to claim 1, wherein all of the at least two valves assume substantially the same position during operation by way of the at least one elastic portion, the positions of the at least two valves comprising a CLOSED and an OPEN position, each CLOSED and OPEN position being determined by abutments.

9. Intake module according to claim 1, wherein by way of a rotationally working actuating mechanism and a substantially translational movement of the coupling mechanism, the coupling mechanism is moved substantially in a direction of a longitudinal axis of the coupling mechanism through an eccentric pin or linking pin on the actuating mechanism and an opening on the coupling mechanism.

10. Intake module according to claim 3, wherein the coupling mechanism comprises a plurality of main rods having arms extending out from the main rods and operating as connecting elements for connection to the valves, the main rods being articulated to one another and the at least one elastic area comprising a material thinning of a main rod and being situated in an area of the connection with the arms, and the operation of two main rods to each of which two valves are connected is performed by a third main rod connected to the two main rods, the main rods being substantially identical.

11. Intake module according to claim 4, wherein the coupling mechanism is made in one piece including a main rod and branch rods projecting substantially horizontally therefrom for connection with the at least two valves, the at least one elastic portion being configured as a cross-sectional narrowing of the branch rods, and the coupling mechanism being operated by a servomotor with an eccentric pin on the drive end of the main rod, and an opening formed thereon and disposed perpendicular to the main rod.

12. Intake module according to claim 5, wherein the coupling mechanism is made by an injection molding method from plastic.

13. Intake module according to claim 1, wherein each intake duct includes an annular gap to which gases are delivered from one of a crankcase vent, an exhaust gas return, and a fuel tank ventilation.

14. Intake module according to claim 1, wherein on an end face of the intake module facing an internal combustion engine a gasket is provided as a tolerance equalizing element between a housing of the intake module and a valve mounting as an insert in an intake duct.

15. Intake module according to claim 6, wherein the connecting elements are connected articulately to a main rod of the coupling mechanism, the connecting elements being relatively stiff and the elastic portions being formed at a connection of the connecting elements to the main rod.

16. Intake module according to claim 5, wherein the connecting elements are made by an injection molding method from plastic.

* * * * *